United States Patent [19]

Shibui et al.

[11] Patent Number: 4,694,406

[45] Date of Patent: Sep. 15, 1987

[54] APPARATUS FOR DISPLAYING SCROLLING IMAGES

[75] Inventors: Michiro Shibui, Tokyo; Yoshihiro Hanamoto, Hyogo; Yoshio Ishigaki, Tokyo; Hiroshi Sahara, Kanagawa; Satoru Maeda, Kanagawa; Yasushi Noguchi, Kanagawa, all of Japan

[73] Assignees: Nippon Telegraph & Telephone; Sony Corporation, both of Tokyo, Japan

[21] Appl. No.: 722,448

[22] Filed: Apr. 12, 1985

[30] Foreign Application Priority Data

Apr. 13, 1984 [JP] Japan .................................. 59-74367

[51] Int. Cl.[4] .................................................. G06F 3/14

[52] U.S. Cl. .................................... 364/518; 340/726; 364/521; 364/900

[58] Field of Search ........ 364/518, 521, 200 MS File, 364/900 MS File; 340/716, 724, 726

[56] References Cited

U.S. PATENT DOCUMENTS

| | | | |
|---|---|---|---|
| 4,228,432 | 10/1980 | Osborne | 364/521 X |
| 4,386,410 | 5/1983 | Pandya et al. | 364/521 X |
| 4,412,294 | 10/1983 | Watts et al. | 364/521 X |
| 4,595,917 | 6/1986 | McCallister et al. | 364/521 X |

*Primary Examiner*—Felix D. Gruber
*Assistant Examiner*—H. R. Herndon
*Attorney, Agent, or Firm*—Lewis H. Eslinger; Alvin Sinderbrand

[57] ABSTRACT

An apparatus for scrolling the display of images obtained from a plurality of data units, each having pattern signals representing a plurality of horizontal lines and a corresponding color signal includes a video display having a plurality of horizontal display lines, a first memory for storing the pattern signals formed with first addresses corresponding to the plurality of horizontal display lines and a first buffer area for temporarily storing received pattern signals, a second memory for storing the color signal formed with second addresses corresponding to the numbers of the data units and a second buffer area for temporarily storing a received color signal, the pattern signals and a corresponding color signal being stored in the first and second buffer areas, respectively. A read out system operates so that the first memory, including the first buffer area, is read out by accessing the first addresses in a pre-determined order and so that the second memory, including the second buffer area, is read out by accessing the second addresses in a pre-determined order. Also provided is a circuit for transferring the pattern signal of a horizontal line stored in the first buffer area to a corresponding address of the first memory and for transferring a corresponding color signal stored in the second buffer area to a corresponding address of the second memory, and a circuit for supplying the pattern signals and the corresponding color signal to the display tube.

8 Claims, 58 Drawing Figures

Displaying Picture Screen
248 Dots
204 Dots

Sub-Row
31 Sub-Columns
#0
#1
#2
#16
8
12
FIG. 2A G
8
8
32
FIG. 2B C
8
16
8
x 31
( x 31)
FIG. 2C S
8
24
192

14P
14C

LA
CA
14P
14C
14
R
S
T
SCGT
DSP1
DSP2

APPARATUS FOR DISPLAYING SCROLLING IMAGES

BACKGROUND OF THE INVENTION

1. Field of the Invention

This invention relates generally to image display apparatus and, in particular, to apparatus for scrolling displayed images obtained through a so-called character and pattern telephone access information network system (CAPTAIN).

2. Description of the Background

Systems have been proposed utilizing standard telephone network lines to transmit various kinds of image information and to display such image information on the picture screen of a television receiver. One such proposed system is the so-called CAPTAIN system.

In such CAPTAIN system the format of the displaying picture screen is formed of 204 dots in the column direction and 248 dots in the row direction. In describing such screen display the following definitions are generally employed.

(1) dot: the minimum unit for forming the picture screen;

(2) line: a series of 248 dots in the lateral or horizontal direction of the display picture screen that is used as the minimum unit indicating the display position in the longitudinal or vertical direction;

(3) sub-row: a number of display areas each of which is formed by dividing the display picture screen at its upper end by an area including 248 dots in the row direction and 12 dots in the column direction and which is used as a unit indicative of the display position in the column direction;

(4) sub-column: a number of display areas each of which is formed by dividing the display picture screen at its upper-left end by an area including 8 dots in the row direction and 204 dots in the column direction and which is used as a unit indicating the display position in the row direction;

(5) sub-block: a display area where the sub-column and the sub-row overlap that is used to specify the color; and (6) picture screen header: the uppermost sub-row on which is displayed a title or the like concerning the information now being displayed, that is, the monitor display.

A typical display picture screen is formed of 17 sub-rows ×204 lines and one sub-row is formed of 12 lines, however, in the following description, when the lines are counted from top to bottom, they are numbered from the 1st line to the 204th line, respectively, and when the lines are counted at every sub-row, they are numbered from the 1st to 12th line of each sub-row, respectively. Further, the sub-rows are numbered as the 0th sub-row to the 16th sub-row, respectively.

Generally, the format of the data signals, which are transmitted from the data base center of the CAPTAIN system to the terminal apparatus is chosen such that one section of the format is called a "packet". Each of these packets includes at its beginning a packet code indicating the kind of the packet it belongs to. Generally, there is a picture screen control packet, a color information packet, and a small character sequential display packet. Further, the picture screen control packet includes, following the packet code, a code indicative of the display mode and a code for designating the color of the picture screen header and the like. The color information packet includes a code indicating to which sub-row this packet belongs, or the display position per sub-row unit in the column direction and a color code for specifying the color of each sub-block in the sub-row designated by this code and so on. Additionally, the small character sequential display pattern packet includes a code indicating to which line this packet belongs, or indicating the display position of the line unit in the longitudinal direction and a pattern data indicative of dots on the line designated by this code. These packets are divided by flags each of which has a particular bit arrangement and then transmitted from the data base center of the CAPTAIN system to the terminal apparatus of the user.

The above-described picture screen control packet, can designate a fixed display mode and a scroll display mode, and in the scroll display mode, a difference between the display position of the displayed picture information and the display position of the newly received picture information is obtained and the picture information being displayed is shifted upwards by this difference amount, thus, the picture information is displayed under the condition that the new picture information is inserted into the lowermost portion of the display picture screen. The picture screen header is not displayed in the scroll display mode.

One kind of terminal apparatus for the CAPTAIN system is controlled by a microcomputer, having a central processing unit for parallel processing, a read only memory in which is stored its processing program, a random access memory for work area and buffer area, a video RAM having a capacity of one picture screen amount or above, a color picture tube, a read address control circuit, and a deflecting circuit. The output from the deflecting circuit is supplied to the color picture tube in which the deflection is carried out. The synchronizing signal from the deflecting circuit is supplied to the read address control circuit which then produces a read address signal corresponding to the deflection position of the picture tube, and this signal is also supplied to the video RAM. Accordingly, from the video RAM, there is read out address data corresponding to the deflection position of the color picture tube, and this data is supplied to the color picture tube which displays the data which is written in the video RAM.

Additionally, circuitry is required for connection to the telephone lines used to transmit the data.

Consequently, the data signal from the data base center of the CAPTAIN system fed through the telephone network lines is demodulated by a modulator/-demodulator, converted from a serial signal to a parallel signal by a serial-to-parallel converting circuit and then fed to the CPU. Conversely, a data request signal from the CPU is converted from parallel to serial by the parallel-to-serial converting circuit, modulated by the modulator/demodulator and then fed through the telephone network line to the data base center of the CAPTAIN system.

When the above-mentioned scrolling display is carried out, the data access for the video RAM is generally carried out such that the video RAM is formed into one section in which the pattern data is accessed and one section in which the color code is accessed.

The read-outs for the video RAM sections are carried out at every field in synchronism with the scanning of the color picture tube. Wherein, the read address of the first section of the video RAM is varied at every horizontal period, while since the color is determined on a sub-block unit basis and one sub-block is formed of 12 lines, the read address of the second section of the video RAM is varied at every 12 horizontal lines.

Since the data transmission from the data base center of the CAPTAIN system and the scanning of the color picture tube are not synchronized with each other, the writing and the reading of data into and out of the video RAM sections are not always carried out alternately, and since the data transmission rate is lower than the display speed, the data is read out several times for one writing.

In short, upon scrolling display, the first to 12th addresses of the first video RAM section and the 0th address of the second video RAM section are used for the picture screen header and the data are written therein once. However, the last addresses or 216th and 17th addresses of the video RAM sections are connected to the 13th and first addresses thereof in an operation standpoint. Thus, the 13th to 216th addresses of the video RAM first section and the first to 17th addresses of the video RAM second section are formed as so-called ring shapes, respectively. Then, the data newly received are written in the next addresses (the address followed by the 216th and 17th addresses are 13th and 1st addresses) of the ring shapes. The scrolling display is generally carried out as mentioned above.

In this method, however, when the data of the color information packet or the small character sequential display pattern packet is not obtained due to noise and so on, mis-matching will occur between the pattern and the color which will hereinafter be scroll-displayed.

More particularly, since the color code and the pattern data of the 0th sub-row of the 1st page are the picture screen header and they are not scrolled, except the color code and the pattern data as described above, the beginning of each page becomes the 1st sub-row. For example, when the addresses of the video RAM sections in which the color code of the 1st sub-row and the pattern data of the 1st line are written are considered, they are written in the 17th and 205th addresses with respect to the 1st page, while they are written in the 16th and 193rd addresses with respect to the 2nd page, and they are written in the 15th and 181st addresses with respect to the 3rd page. In other words, if the page is changed, even with the same sub-row and the same line, the addresses in which the color code and the pattern data thereof are written are decremented at every page by 12 addresses and 1 address, respectively.

Accordingly, even if the color information packet and the small character sequential display pattern packet contain the codes indicative of their display positions, the addresses in which the data are written are changed with the pages so that it is very difficult to write the color code or the pattern data in the two sections of the video RAM by using the display position codes.

To cope with this defect, when the color code or the pattern data is obtained, this color code or the pattern data is written in the address following the address in which the previous color code or pattern data is written.

Accordingly, if the color code of the color information packet at its n-th address is not obtained due to, for example, noise, the color code of the color information packet at its (n+1)th address is written in the address in which the color code of the color information packet at the n-th address should be written. Thus, thereafter, all color codes are written in the video RAM with addresses decremented by every one address (the color code of one sub-row amount is displaced upward in the picture screen).

As a result, if the color code and the pattern data are read out to thereby carry out the scroll display, all the pictures under the sub-row of which the color code can not be obtained are scroll-displayed with the color being displaced by one sub-row amount relative to the pattern data, and this is continued until the scrolling display is ended.

On the other hand, when the pattern data of the small character sequential display pattern packet is not obtained, due to the similar reason, the succeeding pattern data is incremented by one address and then written in the video RAM hereinafter. Consequently, all picture images below the line of which the pattern data is not obtained are scroll-displayed such that the patterns and the colors thereof are mis-matched by one line each. This is continued until the scrolling display is ended.

As described above, if the color code of the color information packet and/or the pattern data of the small character sequential display pattern packet are not obtained, in the following scrolling display the pattern and its color are all displaced with each other.

OBJECTS AND SUMMARY OF THE INVENTION

Accordingly, it is an object of this invention to provide an improved image display apparatus.

It is another object of this invention to provide an image display apparatus that can prevent a displayed pattern and its associated color from being displaced relative to each other.

It is a further object of this invention to provide an image display apparatus for use in scrolling display.

According to an aspect of this invention, there is provided an apparatus for displaying scrolling images obtained from a plurality of data units each having pattern signals of a plurality of horizontal lines and a corresponding color signal, including a video display of the kind having a plurality of horizontal display lines; a first memory for storing pattern signals and having first addresses corresponding to the plurality of horizontal display lines, and a buffer area for temporarily storing the pattern signals being received; a second memory for storing the color signal and having second addresses corresponding to the number of data units, and a buffer area also for temporarily storing the color signal being received; a pattern signal store for storing pattern signals and a corresponding color signal in said first and second buffer areas, respectively; a controller for reading out the first memory including reading out the first buffer area by accessing first addresses in a pre-determined order and for reading out the second memory including reading out the second buffer area by accessing the second addresses in a pre-determined order; a transfer device for transferring a pattern signal of a horizontal line stored in the first buffer area to a corresponding address of the first memory, and a corresponding color signal stored in said the second buffer area to a corresponding address of the second memory and for supplying the pattern signals and corresponding color signal to the video display.

These and other objects, features, and advantages of the present invention will become apparent from the following detailed description of illustrative embodiments thereof taken in conjunction with the accompanying drawings, throughout which like reference numerals designate like elements and parts.

BRIEF DESCRIPTION OF THE DRAWINGS

FIGS. 2A to 2C are diagrammatic representations of formats for data signals used in the CAPTAIN system:

DESCRIPTION OF THE PREFERRED EMBODIMENT

Figures 1A, 1B:
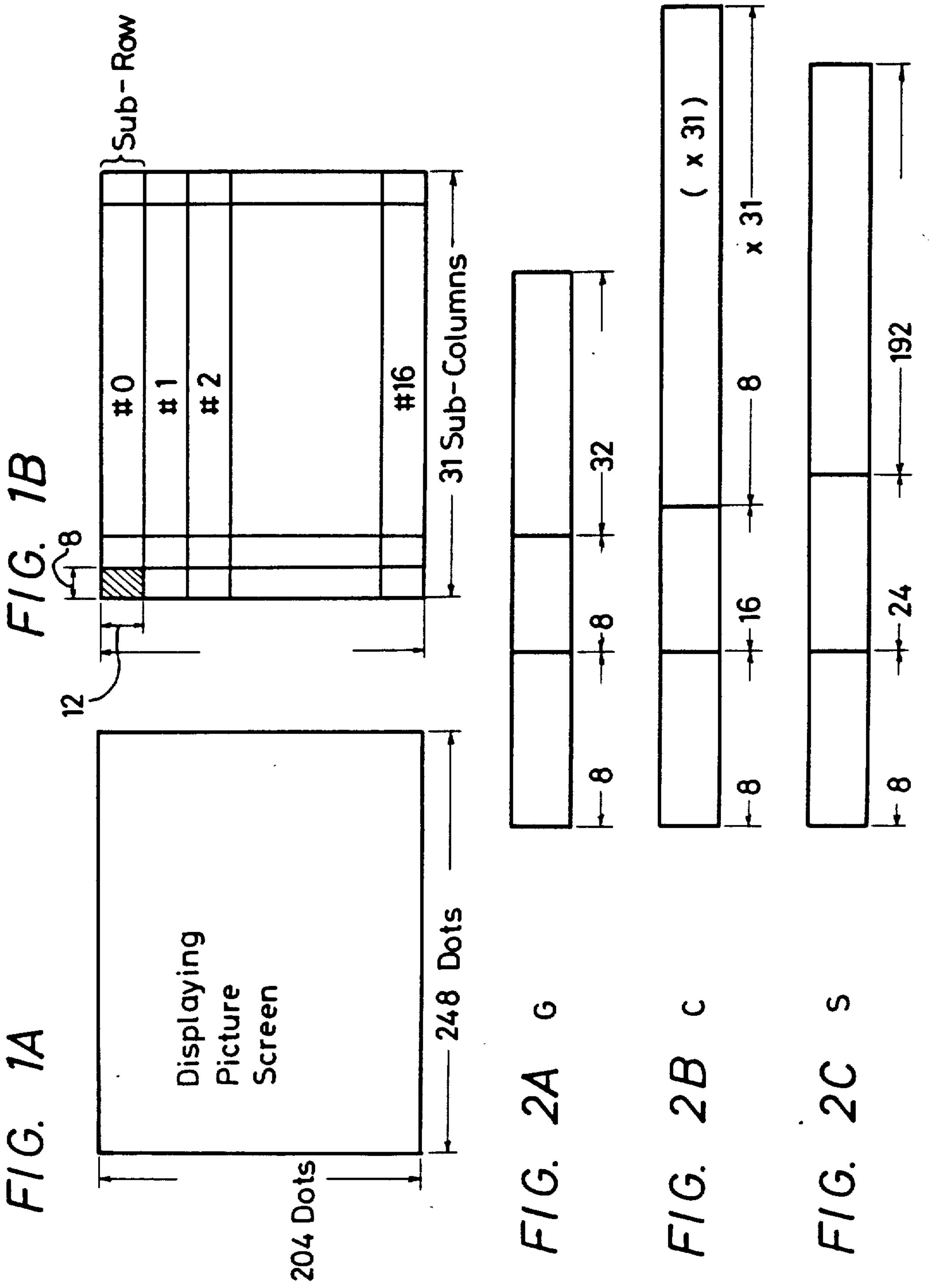
FIGS. 1A and 1B are diagrammatic representations of data formats for a picture screen of a character and pattern telephone access information network system (CAPTAIN)
Figure 3:
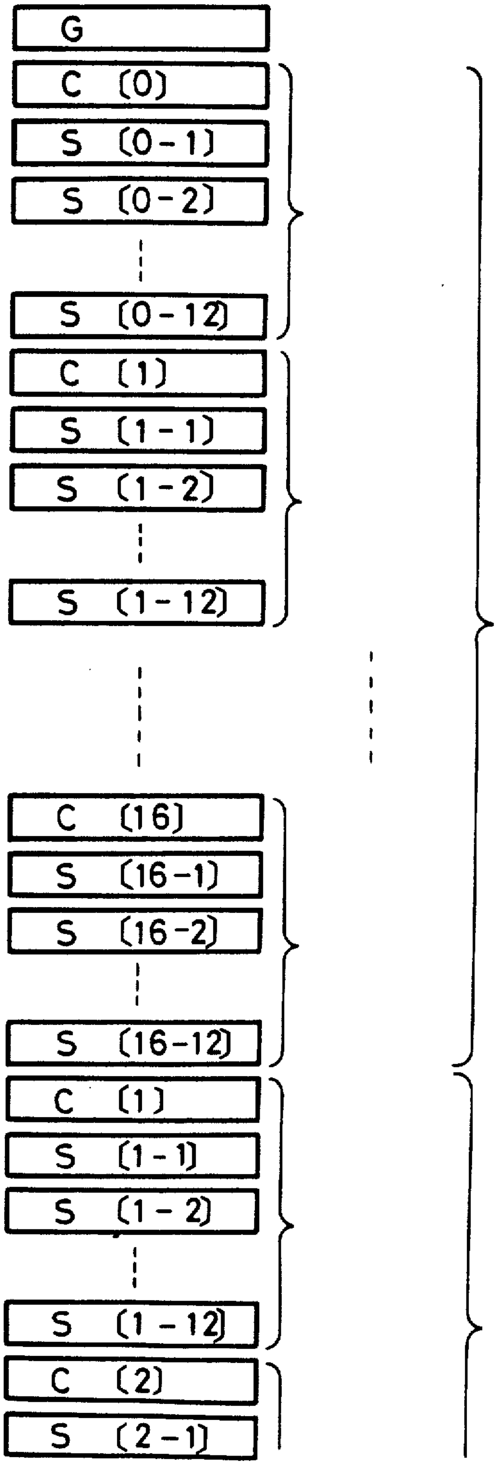
FIG. 3 is a diagrammatic representation showing a combination of the data signals present upon scrolling display.

FIGS. 1 to 3 illustrate data formats for the CAPTAIN system and, more specifically, FIGS. 1A and 1B, respectively, are diagrams showing the format of the displaying picture screen. This picture screen is formed of 204 dots in the column direction by 248 dots in the row directions, and the terms used in describing such picture screen are as defined hereinabove.

One display picture screen is formed of 17 sub-rows $\times$ 204 lines and one sub-row is formed of 12 lines. In the following description, when the lines are counted from top to bottom, they are numbered as the 1st line to the 204th line, respectively, and when the lines are counted at every sub-row, they are denoted the 1st to 12th line of each sub-row, respectively. Further, the sub-rows are numbered as the 0th sub-row to the 16th sub-row, respectively.

Figure 4:
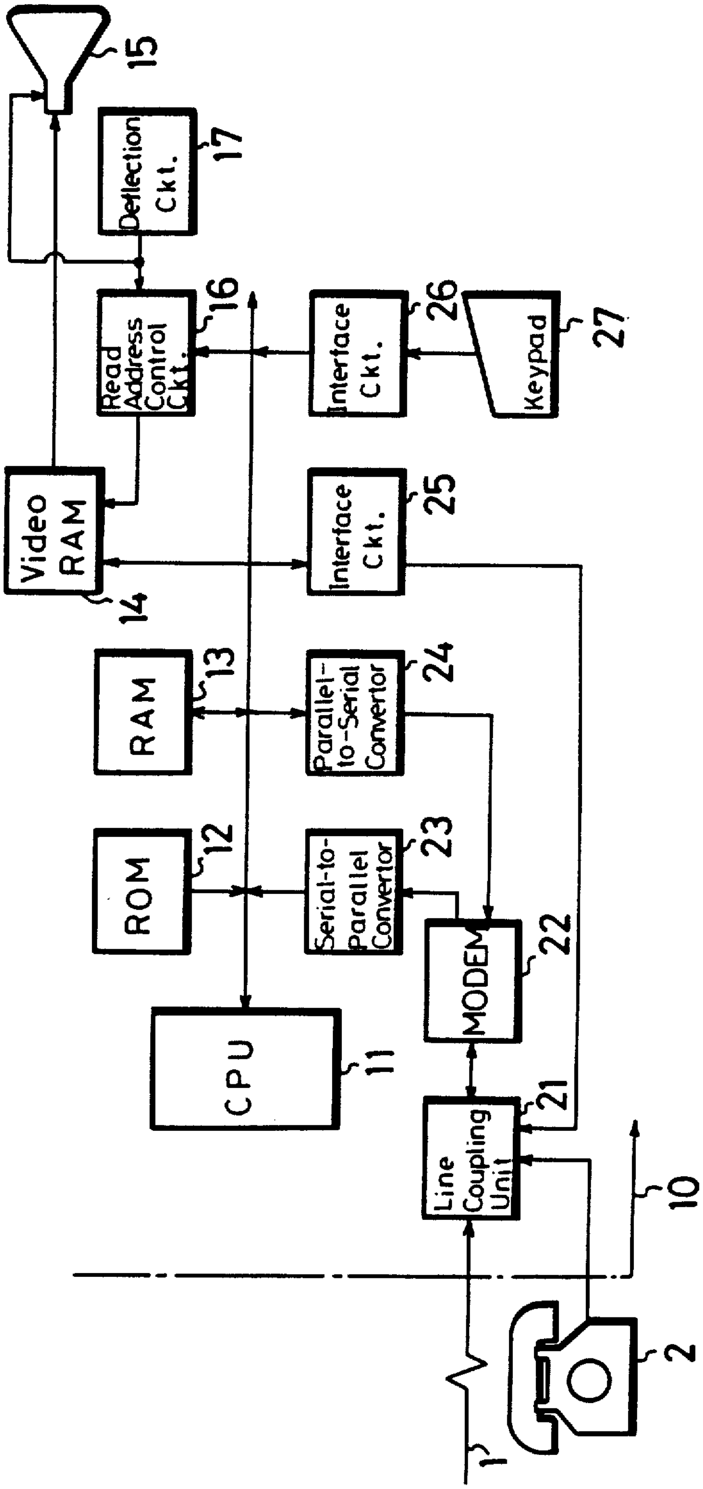
FIG. 4 is a block diagram of a special terminal apparatus used in the CAPTAIN system.

FIGS. 2A to 2C are diagrams showing the formats of the data signals that are transmitted from the data base center of the CAPTAIN system to the terminal apparatus of each user, shown in more detail in FIG. 4. One section of the format is called a "packet", and FIG. 2A illustrates a picture screen control packet (hereinafter simply referred to as a "G packet"); FIG. 2B illustrates a color information packet (hereinafter simply referred to as "C packet"); and FIG. 2C illustrates a small character sequential display pattern (hereinafter simply referred to as "S packet"). Each of these packets includes at its beginning a packet code indicating what kind of packet it is.

Following the packet code, the G packet includes a code indicative of the display mode and a code for designating the color of the picture screen header or the like. The C packet includes a code indicating to which sub-row this packet belongs, or indicating the display position per sub-row unit in the column direction, and a color code for specifying the color of each sub-block in the sub-row designated by this code. Further, the S packet includes a code indicating to which line this packet belongs, or indicating the display position of the line unit in the longitudinal direction and a pattern data indicative of dots on the line designated by this code. These packets are divided by flags each of which has a particular bit arrangement and are then transmitted from the data base center of the CAPTAIN system to the terminal apparatus of the user.

In regard to the display modes designed by the above-described G packet, there can be a fixed display mode and a scroll display mode. In the scroll display mode, a difference between the display position of the displayed picture information and the display position of the newly received picture information is obtained, and the picture information being displayed is shifted upwards by this difference amount. Thus, the picture information is displayed under the condition that the new picture information is inserted into the lowermost portion of the display picture screen, however, the picture screen header is not displayed in this scroll display mode.

Accordingly, in this scroll display mode, the packets are transmitted in the combinations as shown in FIG. 3, that is, the G packet is transmitted first and then the C packet [0] for designating the color of the 0th sub-row and so on is transmitted. Thereafter, 12 S packets [0–1]to [0 –12]including pattern data of 12 lines at the 0th sub-row are transmitted sequentially. The picture screen header is displayed in the 0th sub-row by the C and S packets [0], [0 –1] to [0–12], respectively.

Subsequently, the C packet for designating the color of the first sub-row is transmitted and then 12 S packets [1–1]to [1–12]including the pattern data of the lines of the first sub-row are transmitted sequentially. Similarly, the C packet and the S packet are transmitted sequentially thereafter. Thus, the picture information is continuously being shifted one-by-one upwardly on the picture screen.

When the S packet [16–12]of the last line of the 16th sub-row (204 lines in total) is transmitted and then displayed on the display picture screen, the display of the first page is completed and the next succeeding page is scroll-displayed by the respective C and S packets following the first page.

FIG. 4 illustrates an example of a special terminal apparatus for use in the CAPTAIN system in which a telephone subscriber's telephone network line 1 and a standard telephone 2 are connected to the special terminal apparatus 10. The terminal apparatus 10 is controlled by a microcomputer, including an 8-bit central processing unit (CPU) 11 for parallel processing, a read only memory (ROM) 12, in which stored is the processing program, a random access memory (RAM) 13 for work area and buffer area, and a video RAM 14 having a data capacity of at least one picture screen amount. A color picture tube or cathode ray tube (CRT) 15 is provided along with a read address control circuit 16 and a deflection circuit 17.

The output signal from deflection circuit 17 is fed to color picture tube 15, wherein the deflection is carried out and a synchronizing signal from deflection circuit 17 is fed to read address control circuit 16, which then produces a read address signal corresponding to the deflection position on the picture tube 15, and this read address signal is fed to video RAM 14. Accordingly, from video RAM 14, there is read out address data corresponding to the deflection position on color picture tube 15, and this data is supplied to color picture tube 15, which therefore displays thereon the data, which is written in video RAM 14.

Also provided is a hybrid circuit or line coupling unit (LCU) 21, a modulator and demodulator (MODEM) 22, a serial-to-parallel converting circuit 23, a parallel-to-serial converting circuit 24, I/0 ports or interface circuits 25 and 26, and a key pad 27 used by a user to carry out various operations. LCU 21 is controlled by the output of CPU 11 through interface circuit 25 and, upon use of the CAPTAIN system, the telephone network line 1 is coupled through LCU 21 to MODEM 22.

Consequently, the data signal frcm the data base center of the CAPTAIN system through the telephone network lines 1 is demodulated by MODEM 22, converted from a serial signal to a parallel signal by serial-to-parallel converting circuit and then fed to CPU 11. Conversely, the data signal, which is a request signal, from CPU 11 is converted from a parallel signal to a serial signal by parallel-to-serial convertor 24, modulated by MODEM 22 and then fed through the telephone network line to the data base center of the CAPTAIN system.

Only that portion of the CAPTAIN system that relates to this invention is summarized above and it is to be understood that other elements and data are involved, for example, there is a packet which includes other data. Nevertheless, such packet is not directly related to this invention and can be represented by the above-described packets, so that its detailed description can be omitted for brevity and clarity.

Figures 5A, 5B, 5C, 5D, 5E, 5F, 5G, 5H:
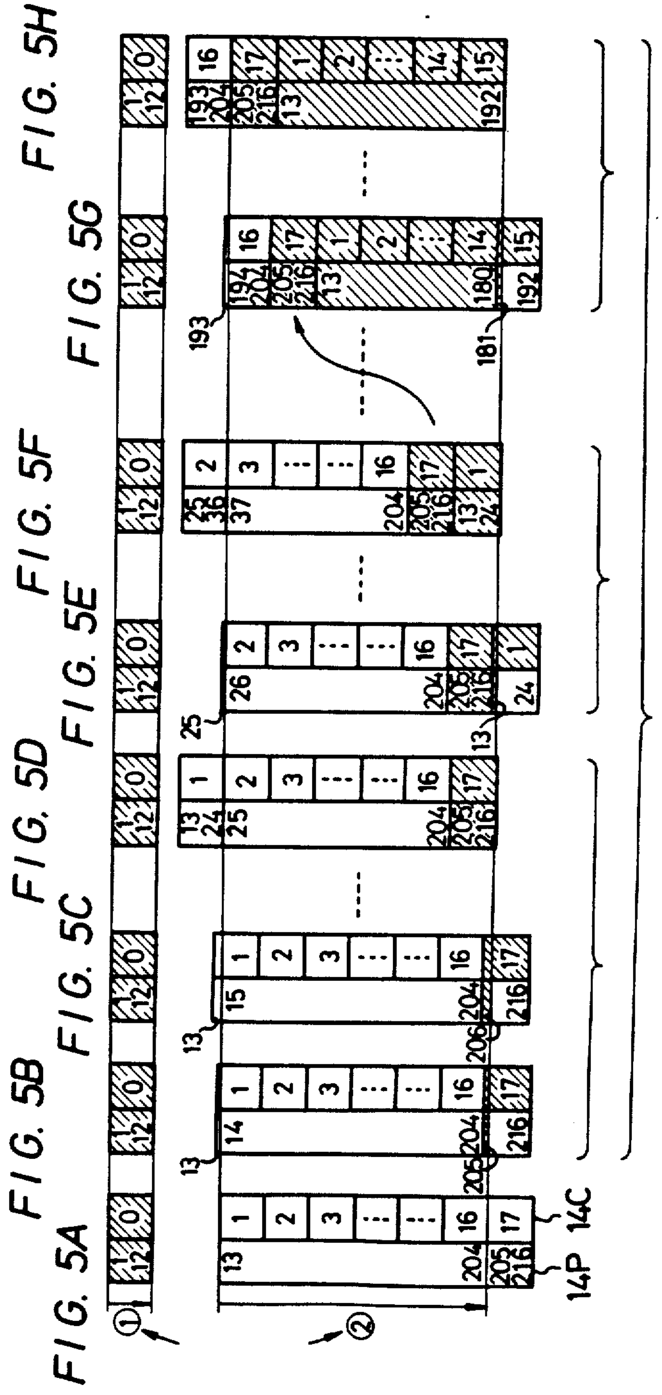
FIGS. 5A to 5L are pictorial representations of data arrangements useful in explaining the accessing operation of the video RAM used in the terminal apparatus of FIG. 4.
Figures 5I, 5J, 5K, 5L, 6A, 6B, 6C, 6D:
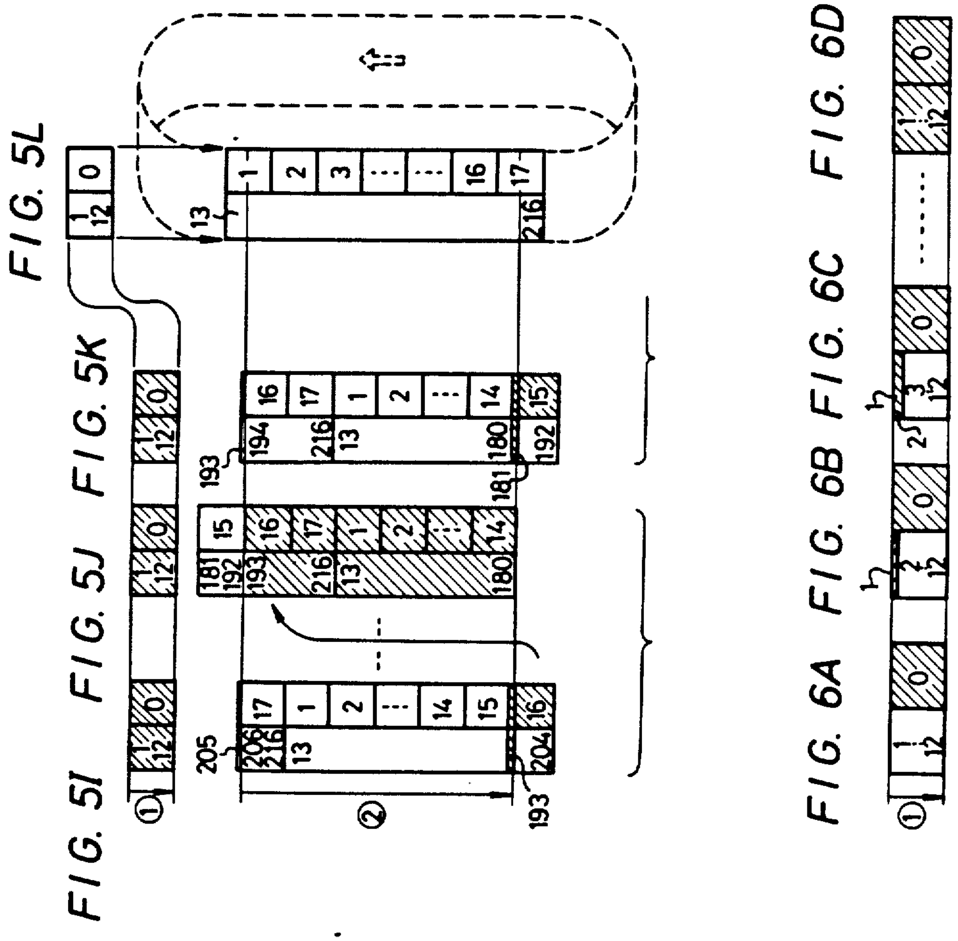
FIGS. 6A to 6D are pictorial representations of data arrangements useful in explaining the accessing operation of the video RAM of FIG. 4.

When the scrolling display is carried out, the data access for video RAM 14 is generally carried out in a manner represented in FIGS. 5A to 5L and 6A to 6D. FIGS. 5 schematically illustrates the internal addresses of video RAM 14, in which reference numeral 14P designates a video RAM in which the pattern data is accessed and reference numeral 14C designates a video RAM in which the color code is accessed. In video RAM 14P, numerals [1 to 216]represent line addresses, in which the pattern data of one line can be accessed from each address and further in the video RAM 14C, numerals [0–17]represent sub-row addresses (sub-row addresses) of the RAM 14C, in which the color code of one sub-row can be accessed from each address. The addresses 1 to 12 of video RAM 14P and the 0th address of video RAM 14C correspond to the picture screen header. FIG. 6 shows exclusively the addresses 1 to 12 and the 0th address of video RAMs 14P and 14C which correspond to the picture screen header. In FIGS. 5A to 5L and 6A to 6D, the cross-hatched addresses indicated those whereat the newest data of each page is written.

Reading out of video RAMs 14P and 14C is carried out at every field in synchronism with the scanning of the color picture tube 15. In this case, in FIGS. 5A to 5L and 6A to 6D arrows ① and ② indicate a range of addresses being accessed and the order thereof in the reading at every field, respectively. The read address of the RAM 14P is varied at every horizontal period, while because the color is determined on a sub-block unit basis and one sub-block is formed of 12 lines, the read address of video RAM 14C is varied at every 12 horizontal lines. For example, when the 2st to 12th addresses of video RAM 14P are sequentially read out, the 0th address of video RAM 14C is read out 12 times simultaneously.

Because the data transmission from the data base center of the CAPTAIN system and the scanning of color picture tube are not synchronized with each other, the writing in and the reading out of data relative to video RAMs 14P and 14C are not always carried out strictly alternately, and because the data transmission rate is lower than the display rate, the data is read out several times for one writing in period.

Accordingly, when the scrolling display is carried out and if the data is transmitted as shown in FIG. 3, the following operations will be carried out.

(i) When the C packet [0]of the 0th sub-row is transmitted, the color code is written in the 0th address of video RAM 14C, as shown by the cross-hatched portion in FIG. 6A but as shown in FIG. 5A, the reading of video RAM 14P is started form the first address and carried out continuously up to the 204th address, while at the same time, the reading of video RAM 14starting from the 0th address up to the 16th address is continuously carried out 12 times.

(ii) When the S packet [0–1] of the first line of the 0th sub-row is transmitted, the pattern data thereof is written in the first address of video RAM 14P, as shown by the cross-hatched portion of FIG. 6B, and the reading of video RAMs 14P and 14C is the same as that of operation (i) above.

(iii) When the S packet [0–2]of the second line of the 0th sub-row is transmitted, the pattern data thereof is written in the second address of video RAM 14P, as shown by the cross-hatched portion of FIG. 6C, and the reading of video RAMs 14P and 14C is again the same as that of operation (i) above.

(iv) The similar operation is repeated and when the packet [0–12]of the 12th line of the 0th sub-row is transmitted, the pattern data thereof is written in the 12th address of the video RAM 14P, as shown by the cross-hatched portion in FIG. 6D, and the reading of video RAMs 14P and 14C is also the same as that of operation (i) above.

Consequently, by the reading in according to the above (i) to (iv) operations, the picture screen header is displayed in color at the position of the 0th sub-row on the picture screen of color picture tube 15.

(v) When the C packet [1] of the first sub-row is transmitted, the color code thereof is written in the 17th address of video RAM 14C, as shown by the cross-hatched portion of FIG. 5B, and the reading is the same as that of operation (i) above.

(vi) When the S packet [1–1] of the first line of the first sub-row is transmitted, the pattern data thereof is written in the 205th address of video RAM 14P, as shown by the cross-hatched portion of FIG. 5B, and when the writing is ended, as shown in FIG. 5B, the reading of video RAM 14P is sequential starting from the 1st address to the 12th address and then skipping to the 14th address. Thereafter, the reading of video RAM 14P is sequentially carried out from the 14th address to the 205th address. At the same time, although the reading of the RAM 14C is started from the 0th address, the succeeding first address is read out 11 times (normally 12 times) and the 2nd to 12th addresses are read out 12 times each. Finally, the 17th address is read out once.

Accordingly, by this reading, the picture screen header is displayed in color at the position of the 0th sub-row on the screen of color picture tube 15 and the first line of the first sub-row id displayed in color at the position of the lowermost line thereon, that is, the scrolling display is started.

(vii) When the S packet [1-2] of the second line of the first sub-row is transmitted, the pattern data thereof is written in the 206th address of video RAM 14P as shown by the cross-hatched portion of FIG. 5C, and after this writing, as shown in FIG. 5C, the reading of video RAM 14P is carried out with respect to the area ①, then skipped to the 15th address and sequentially carried out from the 15th address to the 206th address. At the same time, the reading of video RAM 14C is moved from the area ① to the first address, the first address is read out 10 times, and the addresses from the second address to the 16th address are read out 12 times each. Thereafter, the 17th address is read out twice.

Accordingly, by this reading, the picture screen header is displayed in color at the position of the 0th sub-row, and the first and second lines of the first sub-row are displayed in color at the positions of the next following two lines. That is, the scrolling display of one line is carried out for operation (vi).

(viii) Subsequently a similar operation is carried out and when the S packet [1-12]of the 12th line of the first sub-row is transmitted, the pattern data thereof is written in the 216th address of video RAM 14P, as shown by the cross-hatched portion of FIG. 5D. After this writing (FIG. 5D) the reading of video RAM 14P is carried out on the area ① then skips to the 25th address and the addresses from the 25th address to the 216th address are read out sequentially. At the same time, although the first address of video RAM 14C should be read out after the area ①, that reading is not carried out, or the reading of the 1st address is skipped, and the reading is there moved to the 2nd address. Then, the 2nd address to the 17th addresses are sequentially read out 12 times each.

Thence, under this condition, the picture screen header is displayed in color at the position of the 0th sub-row and the 1st sub-row is displayed in color at the position of the lowermost sub-row (the 16th sub-row), that is, the scrolling display of one sub-row amount is carried out.

(ix) When the C packet [2] of the second sub-row is transmitted, the color code thereof is written in the 1st address of video RAM 14C, as shown by the cross-hatched portion of FIG. 5E, and the reading is the same as that of operation (viii) above.

(x) When the S packet [2-1] of the first line of the second sub-row is transmitted, the pattern data thereof is written in the 13th address of video RAM 14P, as shown by the cross-hatched portion of FIG. 5E, and after this writing (FIG. 5E) the area ① of video RAM 14P is read out and the reading then skips to the 26th address. Thereafter, the 26th to the 216th addresses are sequentially read out. The 13th address is read out next and at the same time, the 2nd address of video RAM 14C is read out 11 times after the area ① , the 3rd address to the 17th address are sequentially read out 12 times each and, finally, the 1st address is read out once.

Accordingly, at this time, the picture screen header is displayed in color on the picture screen at the position of the 0th sub-row, and the full lines of the 1st sub-row and the first line of the 2nd sub-row are displayed respectively in color at the positions of the 12th line of the 15th and 16th sub-rows, that is, the scrolling display of one line is carried out further.

(xi) Similar operations will be repeated, as shown in FIGS. 5F to 5H, and FIG. 5F showns a state in which the pattern data of the 12th line of the 2nd sub-row is written. FIG. 5G shows a state in which the pattern data of the 1st line of the 16th sub-row is written, and FIG. 5H shows a state in which the pattern data of the 12th line of the 16th sub-row, or the last pattern data of the first page is written, respectively. In the state shown in FIG. 5H, the data of the 1st line of the 1st sub-row is scrolled to the position of the 1st line of the 1st sub-row, and this means that all data of just one page is scroll-displayed.

(xii) When the C packet [1] of the 1st sub-row of the second page is transmitted, the color code thereof is written in the 16th address of video RAM 14C, as shown by the cross-hatched portion of FIG. 5I, and the reading is the same as that of operation (xi) above.

(xiii) When the S packet [1-1] of the 1st line of the 1st sub-row of the second page is transmitted, the pattern data thereof is written in the 193rd address of video RAM 14P, as shown by the cross-hatched portion of FIG. 5I, and after this writing has ended (FIG. 5I) the area ① of video RAM 14P is read out, and then the reading skips to the 206th address. The 206th address to the 216th address are then read out sequentially and then this reading is then further skipped to the 13th address. Thereafter, the 13th address to the 193rd address are read out sequentially. At the same time, after the area ①of video RAM 14C is read out, the 17th address of video RAM 14C is read out 11 times and the first address to the 15th address are sequentially read out 12 times each. Finally, the 16th address is read out once.

Therefore, upon this reading, the first page is scrolled further by the amount of one line so that the 1st line of the 1st sub-row thereof disappears and the 1st line of the 1st sub-row of the second page is newly displayed at the lowermost position, that is, at the bottom line. In other words, the second page is scrolled after the first page.

(xiv) When the C packet and the S packet of the second page 2 are transmitted subsequently, the scrolling display is carried out similar to the first page, or to the operations shown in FIGS. 5B to 5H. When the S packet [16-22] of the 12th line of the 16th sub-line is transmitted, the state as shown in FIG. 5J is presented.

(xv) When the C packet of the first sub-row of the third page and the S packet [1 - 1] of the 1st line are sequentially transmitted, the state as shown in FIG. 5K is established and similar operations will be subsequently carried out.

In short, as shown in FIG. 5L, upon performing a scrolling display, the 1st to 12th addresses of video RAM 14P and the 0th address of video RAM 14C are used for the picture screen header and the data are written therein once, however, the last addresses, or the 216th and 17th addresses, of video RAMs 14P and 14C are connected to the 13th and 1st addresses thereof from an operation standpoint, as represented by broken line arrows of FIG. 5L, respectively. Thus, the 13th to 216th addresses of video RAM 14P and the 1st to 17th addresses of video RAM 14C are respectively formed in so-called ring shapes. Then, the newly received data are written in the next addresses (the address followed by the 216th and 17th addresses are 13th and 1st addresses) of the ring shapes. Therefore, in order for the addresses in which the new data are written to become the last addresses upon reading, the area ② is read out over 192 lines (the number of lines less the area ① ).

As pointed out above, in this method, however, when the data of the color information packet or the small character sequential display pattern packet is not obtained due to noise or other signal disturbances, a mis-matching will occur between the pattern and the color which is to be scroll-displayed.

Because the color code and the pattern data of the 0th sub-row of the 1st page are the picture screen header and are not scrolled, except the color code and the pattern data as described above, the beginning of each page becomes the 1st sub-row. For example, when the addresses of video RAM 14C and 14P in which the color code of the 1st sub-row and the pattern data of the 1st line are written are considered, they are written in the 17th and 205th addresses with respect to the 1st page, as shown in FIG. 5B, while they are written in the 16th and 193rd addresses with respect to the 2nd page, as shown in FIG. 5I, and they are written in the 15th and 181st addresses with respect to the 3rd page, as shown in FIG. 5K. In other words, if the page is changed, even with the same sub-row and the same line, the addresses in which the color code and the pattern data thereof are written are decremented at every page by 12 addresses and 1 address, respectively.

Thus, even if the C packet and the S packet contain the codes indicative of their display positions, the addresses at which the data are written are changed with the pages so that it is very difficult to write the color code or the pattern data in video RAMs 14C and 14P by using the display position codes.

That is why, when the color code or the pattern data is obtained, this color code or the pattern data is written in the address following the address in which the previous color code or pattern data is written.

Accordingly, if the color code of the color information packet at its n-th address is not obtained due to noise, for example, the color code of the C packet at its (n+1)th address is written in the address in which the color code of the color information packet at the n-th address should be written. Thereafter, all color codes are written in the video RAM with addresses decremented by one every address, so that the color code is displaced upward by one sub-row amount on the picture screen.

As a result, if such the color code and the pattern data are read out to carry out the scroll display, all the pictures under the sub-row of which the color code can not be obtained are scroll-displayed with the color being displaced by one sub-row amount relative to the pattern data, and this continues until the scrolling display is ended.

On the other hand, when the pattern data of the small character sequential display pattern packet is not obtained, for similar reasons, the succeeding pattern data is incremented by one address and then written in the video RAM. Consequently, all picture images below the line of which the pattern data is not obtained are scroll-displayed such that the patterns and the colors thereof are each mis-matched by one line, and this continues until the scrolling display is ended. If the color code of the color information packet and/or the pattern data of the small character sequential display pattern packet are not obtained, in the following scrolling display the pattern and its color are all displaced with each other.

The present invention provides a method and apparatus whereby data is accessed as shown, for example, in FIG. 7, wherein like elements corresponding to those of FIG. 5 are marked with the same reference numerals and will not be described in detail.

Figures 7A, 7B, 7C, 7D, 7E, 7F, 7G, 7H, 7I:
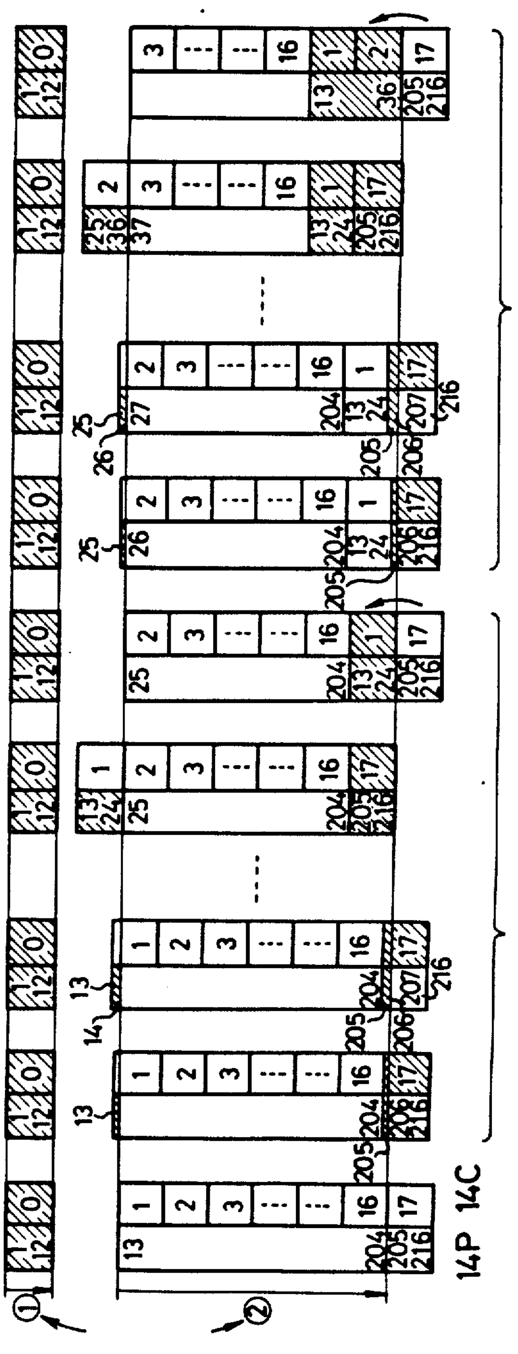
FIGS. 7A to 7Q are pictorial representations of data arrangements useful in explaining the present invention.

Referring to FIG. 7, the principles of the present invention are described as follows:

(I) When the C packet [0]and th S packets [0–1] to [0–12] of the 0th sub-row are transmitted, similar to operation (i) above, the writing and the reading of the color code and pattern data are carried out as shown in FIGS. 6A to 6D and in FIG. 7A. Note that FIG. 7A is the same as FIG. 5A. Accordingly, the picture screen header is displayed in color at the position of the 0th sub-row on the screen of color picture tube 15.

(II) When the C packet [1] of the 1st sub-row is transmitted, the color code thereof is written in the 17th address of video RAM 14C, as shown by the cross-hatched portion of FIG. 7B, and the reading is the same as operation (I) above.

(III) When the S packet [1–1] of the 1st line of the 1st sub-row is transmitted, the pattern data thereof is written in the 205th address of video RAM 14P, as shown by the cross-hatched portion of FIG. 7B, and after this writing (FIG. 7B) the area ① of video RAM 14P is read out and the reading is then skips to the 14th address. Then, the 14th to 205th addresses are read out sequentially. At the same time, after the area ①, the 1st address of video RAM 14C is read out 112 times. Then, the 2nd to 16th addresses are read out 12 times each, and the 17th address is then finally read out once.

Accordingly, by this reading, on the screen of color picture tube 15 the picture screen header is displayed in color at the position of the 0th sub-row and the 1st line of the 1st sub-row is displayed at the bottom line position. In other words, the scrolling display is started. When the reading assumes the state described above, the pattern data at the 205th address of video RAM 14P is transferred to the 13th address, as shown by the cross-hatched portions in FIG. 7B.

(IV) When the S packet [1–2] of the 2nd line of the 1st sub-row is transmitted, the pattern data thereof is written at the 206th address of video RAM 14P, as shown by the cross-hatched portion in FIG. 7C, and after this writing (FIG. 7C) the area ① of video RAM 14P is read out and then the reading is skipped to the 15th address, in which the 15th to 206th addresses are sequentially read out. At the same time, after the area ①, the 1st address of video RAM 14C is read out 10 times and the 2nd to 16th addresses are read out 12 times each. Thereafter, the 17th address is read out twice.

Accordingly, by this reading operation the picture screen header is displayed on the screen oi in color at the position of the 0th sub-row, and the 1st line and 2nd line of the 1st sub-row are displayed in color at a position two lines from the bottom. That is, the scrolling display of one line amount is carried out for operation (III) above. When the reading assumes the state described above, the pattern data of the 206th address of video RAM 14P is transferred to the 14th address, as shown by the cross-hatched portions in FIG. 7C.

(V) When similar operations are repeated and then the S packet [1-12] of the 12th line of the 1st sub-line is transmitted, the pattern data thereof is written at the 206th address of video RAM 14P, as shown by the cross-hatched portion in FIG. 7D, and after this writing (FIG. 7D) the area ① of video RAM 14P is read out and then the reading skips to the 25th address. Thereafter, the 25th to 216th addresses are read out sequentially. Although as to video RAM 14C the 1st address thereof should be read out after its area ①, the 1st address is read out zero times and, hence, the 1st address following area ① is skipped and the 2nd address thereof is then read out. Thereafter, the 2nd to 17th addresses thereof are read out sequentially 12 times each.

Accordingly, under this state, the picture screen header is displayed in color at the position of the 0th sub-line and the first sub-row is displayed in color at the position of the last sub-row. That is, the scrolling display of the one sub-row is carried out. When the reading assumes the state described above, the pattern data at the 216th address of video RAM 14P is transferred to the 24th address thereof, as shown by the cross-hatched portions in FIG. 7D.

Further, as shown by the cross-hatched portions in FIG. 7E, the color code of the 17th address of video RAM 14C is transferred to its 1st address. In this case, although the data of the 205th to 216th addresses of video RAM 14P and the data of the 17th addresses of video RAM 14C are transferred, these data still remain at the original addresses, but they are not shown by the cross-hatched portions in FIG. 7E.

After the transfer of the color code at the 17th address of video RAM 14C is ended, as shown in FIG. 7E, the area ① of the RAM 14P is read out and the reading is then skipped to the 25th address and the 25th address thereof is read out. Subsequently, the 25th to 204th addresses are read out in turn. Thereafter, the 13th to 24th addresses are read out sequentially and at the same time, after area ① of the RAM 14C has been read out, the reading skips to the 2nd address and the 2nd to 16th addresses are read out 12 times each. Subsequently, the 1st address is read out 12 times.

In this case, because the data of the 13th–24th addresses of video RAM 14P and the data of the 1st address of video RAM 14C are those which are respectively transferred from the 205th to 216th addresses and from the 17th address, even if the read address is varied as shown in FIG. 7E, the displayed state is the same as shown in FIG. 7D.

(VI) When the C packet [2] of the 2nd sub-row is transmitted, the color code thereof is written at the 17th address of video RAM 14C, as shown by the cross-hatched portion in FIG. 7F, and the reading is the same as that of operation (V) above (FIG. 7E).

(VII) When the S packet [2-1] of the 1st line of the 2nd sub-row is transmitted, the pattern data thereof is written at the 205th address of video RAM 14P, as shown by the cross-hatched portion in FIG. 7F, and after this writing (FIG. 7F) the area ① of the RAM 14P is read out and the reading is skipped to the 26th address. Then, the 26th to 204th addresses are sequentially read out. Further, after the 13th to 24th addresses are read out sequentially, the 205th address is then read out. At the same time, the area ① of video RAM 14C is first read out and the reading is skipped to the 2nd address, which is then read out 11 times. In turn, the 3rd to 16th addresses are sequentially read out 12 times each. Thereafter, the 1st address is read out 12 times and, finally, the 17th address is read out once.

Accordingly, by this reading the picture screen header is displayed in color at the position of the 0th sub-row on the picture screen of color picture tube 15, and the full lines of the 1st sub-row and the 1st line of the 2nd sub-row are displayed in color at the positions of the 12th line of the 15th sub-row and the 16th sub-row. That is, the scrolling display of one line is carried out further.

When the reading assumes the state described above, the pattern data at the 205th address of video RAM 14P is transferred to its 25th address, as shown by the cross-hatched portions in FIG. 7F.

(VIII) When the S packet [2-2] of the 2nd line of the 2nd sub-row is transmitted, the pattern data thereof is written in the 206th address of video RAM 14P, as shown by the cross-hatched portion in FIG. 7G, and after this writing (FIG. 7G) the area ① of video RAM 14P is read out and then the reading jumps to the 27th address. Thereafter, the 27th to 204th addresses are read out sequentially. Further, after the 13th to 24th addresses are sequentially read out, the 205th and 206th addresses are read out, respectively. At the same time, after the area ① of video RAM 14C is read out, the 2nd address is read out 10 times and the 3rd to 16th addresses are read out sequentially 12 times each. Thereafter, the 1st address is read out 12 times and the 17th address is read out twice. Accordingly, the display is scrolled by extra one line. When such reading state appears, the pattern data at the 206th address of video RAM 14P is transferred to its 26th address, as shown by the cross-hatched portions in FIG. 7G.

(IX) Similar operations will be succeedingly carried out and when the pattern data of the S packet [2-12] the 12th line of the 2nd sub-row is transmitted, the reading of the data from video RAMs 14P and 14C is as shown in FIG. 7H. Under this state, the scrolling display is carried out to the positions of the 15th and 16th sub-rows on the picture screen of the color picture tube 15. When such state is brought about, as shown in FIG. 7I, the color code at the 17th address of video RAM 14C is transferred to its 2nd address. After the transfer of the color code, video RAMs 14P and 14C are read out, as shown in FIG. 7I.

Figures 7J, 7K, 7L, 7M, 7N, 7O, 7P, 7Q:
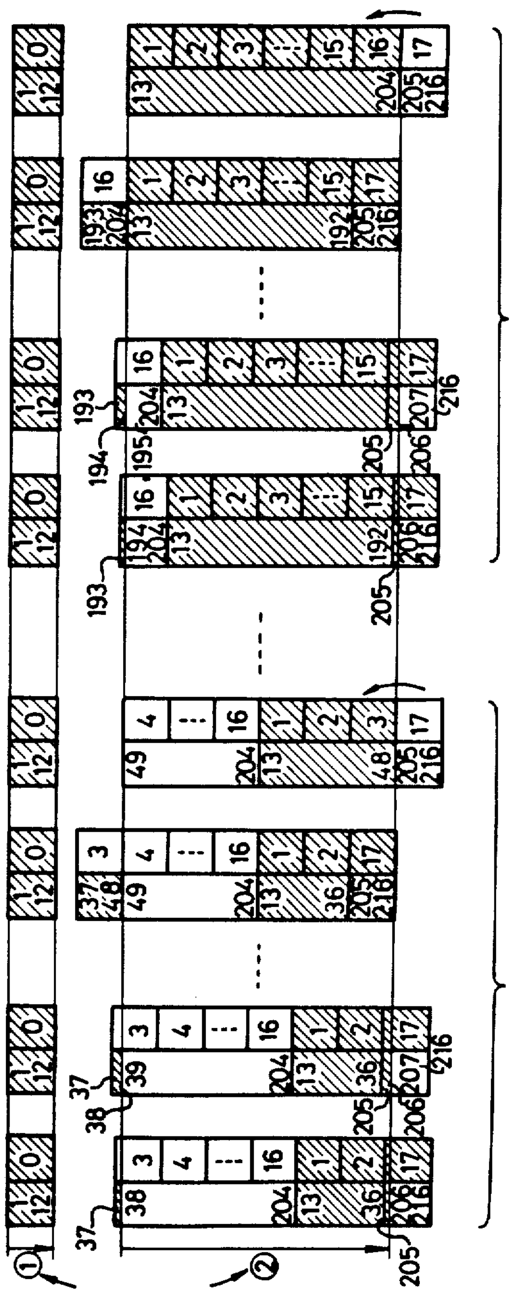

(X) When the C packet [3] and the S packets [3-1] to [3-12] of the 3rd sub-row are transmitted, the data of video RAMs 14P and 14C and the reading of the data therefrom similarly assume the states shown in FIGS. 7J to 7L. That is, the color code and the pattern data of the 3rd sub-row are accessed based on the 17th address of video RAM 14C and the 205th to 216th addresses of video RAM 14P, and the pattern data is transferred to the 37th to 48th addresses of video RAM 14P corresponding to the 3rd sub-line. Then, when the pattern data of the S packet [3-12] at the 12th line of the 3rd sub-row is written in the 216th address of video RAM 14P, the state shown in FIG. 7L appears. As shown in FIG. 7M, the color code of video RAM 14C is transferred to the 3rd address and thereafter the reading is carried out as shown in FIG. 7M.

(XI) The similar operations will be carried out thereafter and when the C packet [16] and the S packets [16-1] to [16-12] of the 16th sub-row are transmitted, the data and the reading of the data therefrom become shown in FIGS. 7N to 7P, respectively. Under the state as shown in FIG. 7P, the 1st line of the 1st sub-row is scrolled to the position of the 1st line of the 1st sub-row on the picture screen of color picture tube 15 or, in other words, the images of exactly one page amount are scroll-displayed.

When the state as shown in FIG. 7P is brought about, the color code at the 17th address of video RAM 14C is transferred to its 16th address, as shown in FIG. 7Q, and thereafter the reading is carried out as shown in FIG. 7Q.

Since the state of FIG. 7Q is exactly the same as that of FIG. 7A, when the C packet [1] of the 1st sub-row of the 2nd page is transmitted, the data and the state thereof become as shown in FIG. 7A, while when the color code and the pattern data of the 2nd page are transmitted, the operations shown in FIGS. 7A to 7Q are once again carried out. Color codes and pattern data of the 3rd page and the following pages are processed similarly, in which each page begins with the state shown in FIG. 1A and ends with the state shown in FIG. 7Q, and the same operations as shown in FIG. 7 are carried out for each page.

According to this invention, the sub-row to which the transferred color code belongs, and the line to which the transferred pattern data belongs, are each made corresponding to the addresses of video RAMs 14C and 14P one-by-one and only when the pattern data of one sub-row are not complete, the color code and the pattern data belonging to the sub-row are written in and read out from the buffer areas (its 205th to 216th addresses and 17th address), while when the pattern data belonging to the sub-row are all complete, the color code and the pattern data are read out from the addresses corresponding to the sub-row and the lines.

Thus, even if the color code of a certain sub-row can not be obtained due to noise, for example, the color code is not written at the corresponding address but the succeeding color code can correctly be written at the corresponding address on the basis of the position indicating code (FIG. 2) which is indicative of the position of that color code. Thus, although the color of the sub-row of which the color code is not obtained due to the noise is disturbed, no mis-matching will occur between the displayed pattern and color in the succeeding sub-row.

Furthermore, even if the pattern data of a certain line is not obtained, the succeeding pattern data can be written in the corresponding address so that no mis-matching will occur between the displayed pattern and color.

Figures 8A, 8B, 8C, 8D, 8E, 8F, 8G, 8H, 8I, 8J, 8K, 8L, 8M, 8N, 8O, 8P, 8Q:
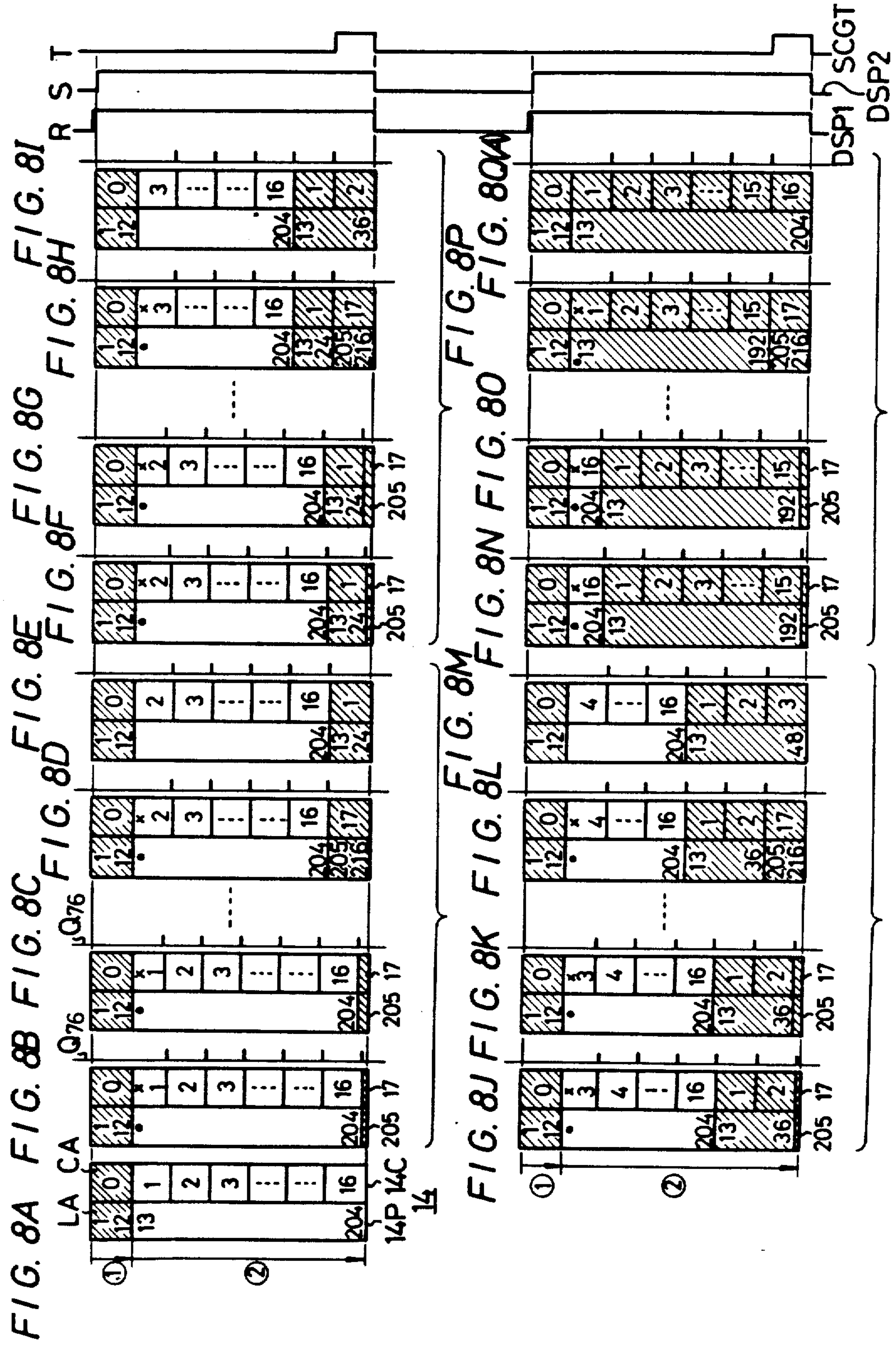
FIGS. 8A to 8Q are pictorial representations of data arrangements relative to the video RAM of FIG. 4 useful in explaining the present invention.

FIG. 8 is a diagram substantially the same as FIG. 7, except that it is partially revised. In FIG. 8, of the addresses in video RAMs 14P and 14C, the addresses from which no reading is carried out are not shown, and, the areas ① and ② are read out successively so that they are shown in continuous form. FIGS. 8A to 8Q correspond to FIGS. 7A to 7Q, respectively. According to FIGS. 8A to 8Q, the reading of video RAM 14P begins with the 1st addresss at every vertical scanning line and continues to the 12th address. The address which will be read out next is the address marked by a ◯ , and such the address increments by one address each time the pattern data is obtained. The reading from the address marked by ◯ is continued and when the reading arrives at the 204th address, the 13th address is read out (except in FIGS. 8B to 8E). Then, the reading is continued from the 13th address to the 24th address and, next, the reading begins with the 205th address.

At the same time, the RAM 14C is also read out similarly. In this case, after the 0th address is read out, an address marked by X will be read out and such address is incremented by one address each time the color code is obtained, and the number of the readings of the address marked by X is decremented by one address each time the pattern data is obtained.

An embodiment of the image display apparatus according to this invention will hereinafter be described with reference to FIG. 9, in which circuits 61 to 65 are principally for the read address of video RAM 14P, while circuits 71 to 77 are principally for the read address of the RAM 14C.

Circuit 61 is an 8-bit presettable up-counter that is supplied with a horizontal synchronizing pulse Ph as the count input and which then forms a line address signal LA (which signal becomes the above-described 1st to 216th addresses) upon the reading of video RAM 14P. Counter 61 is formed such that when the level at input terminal L changes from "0" to "1", the data input at a terminal DI can be loaded (preset) as its count initial value. Circuit 62 is an 8-bit 3-state latch circuit and is supplied with the address (which is the start address of area 2) of video RAM 14P through the CPU 11 and is latched therein. Latch circuit 62 assumes a high output impedance (open) when the level of the terminal OC is "1", while when it is "0", latch circuit 62 supplies its latched content to counter 61 as the preset input thereof.

Circuits 63 and 64 are 3-state output buffers each of which assumes a high output impedance (open), when the level at terminal OC is at "1". When the level at terminal OC is "0", output buffer 63 supplies the value "13" to counter 61 as its preset input, and output buffer 64 supplies the value "205" to counter 61 as its preset input. Accordingly, after any one of the three output values, namely, "the value of mark ◯ ", "13 ", and "205" of latch circuit 62 and output buffers 63 and 64 is loaded into counter 61, the address signal LA is increnented by "1" from its loaded value at every horizontal synchronizing signal $\overline{Ph}$.

Circuit 65 is a decoder that is supplied with the address signal LA from up-counter 61 so that when LA="204", the output $Q_{65}$ thereof becomes "0". Circuit 76 is a 4-bit presettable 12-scale down-counter, and circuit 77 is a 4-bit latch circuit. Counter 76 counts the number reading out of each address of video RAM 14C and latch circuit 77 is supplied with the number reading out of the addresses marked by X of video RAM 14C from CPU 11 and then latched therein. The latched output from latch circuit 77 is supplied to counter 76 as its preset input and the horizontal synchronizing pulse $\overline{Ph}$ is supplied to counter 76 as its count input.

Accordingly, counter 76 produces a borrow output $Q_{76}$ and the borrow output $Q_{76}$ is obtained as shown in the right-hand side of FIGS. 8A to 8Q. In other words, in the address marked by X, after the number of the readings designated by latch circuit 77 (the number of the horizontal synchronizing pulses $\overline{Ph}$), the borrow output $Q_{76}$="1" is established, and thereafter, at every 12 horizontal synchronizing pulses $\overline{Ph}$, $Q_{76}$="1" is established.

Circuits 71 to 75 correspond respectively to circuits 61–65 and, more particularly, circuit 71 is a 5-bit presettable up-counter and is used to produce a sub-row address signal CA (which becomes the 0-th to 17th addresses set forth above) upon reading of video RAM 14C. To this end, the horizontal synchronizing pulse $\overline{Ph}$ is supplied to counter 71 as its count input and the borrcw output $Q_{76}$ is supplied as the count enable signal thereof. Consequently, the address specified by the address signal CA is varied at every signal $Q_{76}$, as shown in FIG. 8.

Circuit 72 is a 5-bit 3-state latch circuit and this latch circuit is supplied with the start address (address marked by X) of the area ② of video RAM 14C from CPU 11 to be latched therein, and this latch circuit 72 supplies the latched content to counter 71 as its preset input when the level at terminal $\overline{OC}$ is "1".

Circuits 73 and 74 are 3-state output buffers each of which assumes a high output impedance when the signal level at terminal $\overline{OC}$ is "1". On the other hand, when it is "0", output buffer 73 supplies the value "1" to counter 71 as its preset input, while buffer 74 supplies the value "17" to counter 71 as its preset input. Accordingly, any one of the output values, namely, "the value of the mark X", "1", and "17" of latch circuit 72 and output buffers 73 and 74 is loaded to the counter 71. After the value is loaded thereto, the address signal CA is incremented by "1" from the loaded value at each borrow signal $Q_{76}$.

Circuit 75 is a decoder that is supplied with the address signal CA from up-counter 71 so that when the address signal CA="16", the level of its output $Q_{75}$ becomes "0".

A flip-flop circuit 81 is used to produce a flag. Flip-flop circuit 81 is controlled by CPU 11, and its output $Q_{81}$ becomes "1" when the 205th to 216th buffer areas and the 17th addresses of video RAMs 14P and 14C are used in writing and reading. It becomes "0" when they are not used, that is, under the states shown in FIGS. 8E,8I,8M and 8Q, $Q_{81}$="0" is established, while under the other states, $Q_{81}$="1" is established.

A signal DSP 1 is provided by counting, for example, the pulse $\overline{Ph}$ and which becomes "1" during a period from the time point prior to the 1st line by one horizontal period to the end of the 204th line, as shown in FIG. 8R. This signal DSP 1 is supplied to the clear terminal CLR of counter 61, so that counter 61 is cleared during the period of DSP 1="0", so as to hold the CL="0", while its clear mode is released during the period of DSP 1="1".

A signal DSP 2 becomes "1" during the period from the beginning of the 1st line to the end of the 204th line, as shown by FIG. 8S, and this signal DSP 2 is fed to the clear terminals $\overline{CLR}$ of counters 71 and 76, respectively. Further, a signal LD becomes "0" during the period of the scanning period of the 12th line in total, and a signal SCGT is a gate signal which becomes "1" during during scanning period at the positions of the 193rd to 204th lines (sub-row 16), as shown in FIG. 8T.

Figure 9:
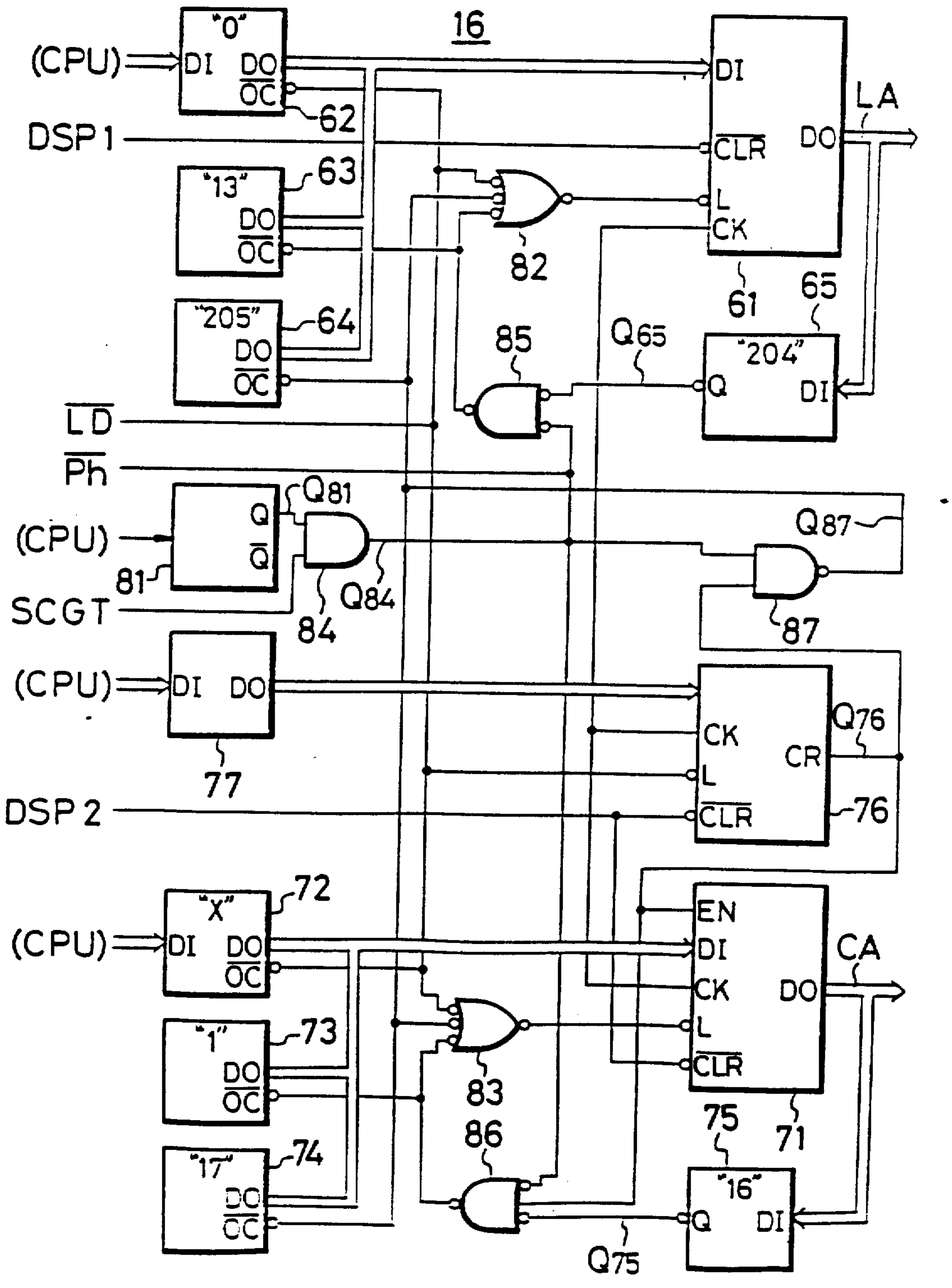
FIG. 9 is a block diagram of an embodiment of a scrolling image display apparatus according to the present invention.

By employing the circuit arrangement of FIG. 9, the following operations can carried out:

(A) As shown in FIG. 8R, because during the period prior to the 1st line (this line number is the number on the picture screen of the color picture tube 15 which is used in the following) by one horizontal period, DSP 1="0" is established, counter 61 is cleared, and hence LA="0" is established. Moreover, as shown in FIG. 8C, since DSP 2="0" is established during this period, counters 71 and 76 are also cleared so that CA="0" and $Q_{76}$="0" are satisfied.

(B) At a time point one horizortal period before the 1st line, the DSP 1="1" is established, so that counter 61 is set in the count mode.

(C) At the start point of the 1st line, because the synchronizing pulse $\overline{Ph}$ is counted in counter 61, LA="1" is established, or the 1st address of video RAM 14P is accessed by the address signal LA. As a result, the pattern data at the 1st line is read out from the 1st address of video RAM 14P.

At this time, since the DSP 2="1" is satisfied, counters 71 and 76 are placed in the count mode. At this time, however, CA="0" is satisfied, or the 0th address of video RAM 14C is accessed by the address signal CA so that the color code of the 0th sub-row is similarly read out from the 0th address of video RAM 14C similar to the pattern data, thus, the 1st line is displayed.

(D) At the start of the 2nd line, the synchronizing pulse $\overline{Ph}$ is counted by counter 61 to establish LA="2", so that the 2nd address of video RAM 14P is accessed by the address signal LA, thereby to read out the pattern data at the 2nd line.

At this time, although the synchronizing signal Ph is counted by counter 76, since $Q_{76}$="0" remains as it is CA="0" is established, thus, the color code of the 0th sub-row is read out from video RAM 14C. As a result, the 2nd line is displayed.

(E) Similar operations will be hereinafter carried out to the 12th line, and the color code and the pattern data of the 0th sub-row are read out and then displayed on the picture screen of color picture tube 15.

(F) During the period in which the above operations (A) to (E) are being carried out, CPU 11 loads the address marked by to latch circuit 62, the address marked by X to latch circuit 72, and further the reading number of the address marked by X to latch circuit 77.

(G) Although during the horizontal scanning period of the 12th line, LD="0" is established, the signal LD rises up from "0" to "1" by the synchronizing pulse Ph at the beginning of the 13th line. Then, this signal LD is supplied to latch circuit 62 as its load pulse. Accordingly, the address marked by ○ which is latched in latch circuit 62 is loaded to counter 61 when starting the horizontal scanning of the 13th line.

The signal LD is supplied to latch circuit 72 and also through an OR circuit 83 to the load terminal L of counter 71 as its load pulse. Consequently, the address marked by X and latched in latch circuit 72 is loaded to counter 71. Further, the signal LD is supplied to the load terminal L of counter 76 as its load pulse and, hence, the reading number of the address marked by X (and latched in latch circuit 77) is loaded in counter 76.

In other words, when starting the horizontal scanning of the 13th line, the address marked by ○ is loaded to counter 61, the address marked by X is loaded to counter 71, and the reading number of the address marked by X is loaded to counter 76.

(H) During the horizontal scanring of the 13th line, because of operation (G) above, the pattern data and the color code are read out from the addresses marked by and X and they are displayed as the 13th line.

(I) Thereafter, the counted value LA of counter 61 incremented at every synchronizing pulse Ph and the read address LA of video RAM 14P is incremented address-by-address from the address marked by ○ at every line, as shown in FIG. 8.

On the other hand, in the counter 76, when the synchronizing pulse Ph is counted by the reading number of the address marked by X, $Q_{76}$="1" is satisfied and thereafter, $Q_{76}$="1" is established at every 12 horizontal synchronizing pulses $\overline{Ph}$. Since the horizontal synchronizing pulse Ph is counted by counter 71 only when $Q_{76}$="1" is satisfied, its counted value CA, or the read address CA of RAM 14C is incremented one address by one address from the address marked by X at every 12 lines, as shown in FIG. 8, if the horizontal scanning is carried out in the reading number of the address marked by X. As described above, the pattern data and the color code are read out up to the LA="204" and are displayed.

(J) When the LA="204" is satisfied, $Q_{65}$="0" is satisfied. In the following description, however, it is assumed that Sthe color code and the pattern data of the sub-row following the 2nd sub-row be transferred, as shown in FIGS. 8F to 8Q, for simplicity. Then, when the condition of $Q_{65}$="0" is established, since SCGT="0" is established, an output $Q_{84}$ of an AND circuit 84 is "0". Accordingly, the signal $Q_{65}$ is supplied through an AND circuit 85 to the terminal OC of output buffer 63 and through OR circuit 82 to the load terminal L of counter 61.

When the scanning period of the LA="204" is ended and the succeeding synchronizing signal $\overline{Ph}$ is obtained, the signal $Q_{65}$ rises from "0" to "1". As a result, at that time, the data "13" of output buffer 63 is loaded to counter 61. At the same time, the similar operations are carried out in output buffer 73 and counter 71. More specifically, when CA="16", $Q_{73}$="0" is established, however, at the next $Q_{76}$="1", when the synchronizing pulse Ph is supplied thereto, the output of an AND circuit 86 is changed from "0" to "1". Since this AND output is supplied to the terminal OC of output buffer 73 and also through OR circuit 83 to the load terminal L of counter 71, at this time, the data "1" of output buffer 73 is loaded to counter 71. In other words, after LA="204" and CA="16", LA="13" and CA="1" are established, respectively.

(K) From the succeeding horizontal scanning period, the reading begins with the state of LA="13" and CA="1". Thereafter, this address signal LA is incremented one address by one address at every line and the address signal CA is incremented one address by one address at every 12 lines. Further, in response to the address, the horizontal scanning position is shifted downward one line by one line.

(L) Under the states shown in FIGS. 8F to 8H, FIGS. 8J to 8L, and FIGS. 8N to 8P, because the buffer area (205th to 216th and 17th addresses) of video RAMs 14P and 14C are used, $Q_{81}$="1" is satisfied, when the horizontal scanning position arrives at the position of the 16th sub-row (sinoe at this time, SCGT="1" is established) $Q_{84}$="1" is satisfied. Then, because the signal $Q_{84}$ and the signal $Q_{76}$ are both supplied to a NAND circuit 87, when $Q_{76}$="1" is established during the period in which the horizontal scanning position is at the 16th sub-row, the output $Q_{87}$ of NAND circuit 87 becomes "0". This signal $Q_{87}$ is supplied to the terminal OC of output buffer 64 and also through OR circuit 82 to the load terminal L of counter 61, so that the data "205" of output buffer 64 is loaded to counter 61. Thus, under the states shown in FIGS. 8F to 8H, FIGS. 8J to 8L, and FIGS. 8N to 8P, when the horizontal scanning position or the address signal LA proceeds to the position of the 16th sub-row, on the following line with the pulse $Q_{76}$="1", the address LA becomes "205".

Further, since the signal $Q_{87}$ is supplied to the terminal OC of output buffer 74 and also through OR circuit 83 to the load terminal L of counter 71, the data "205" is loaded to counter 61 and, at the same time, the data "17" of output buffer 74 is loaded to counter 71. In consequence, the address signal LA becomes "205" and the address signal CA becomes "17" at the same time.

(M) Thereafter, the address signal LA is incremented from "205" by each address at every line, while the address signal CA remains "17".

After the vertical display period is ended, DSP 1="0", DSP="0" and SCGT="0" are established, respectively, thus forming a picture image of one field amount.

(L') Under the states as shown in FIGS. 8I, 8M, and 8Q, and because the buffer areas (205th to 216th and 17th addresses) of video RAMs 14P and 14C are not used, $Q_{81}$="0" is established. Accordingly, even when the horizontal scanning position is reached to the position of the 16th sub-row and SCGT="1" is established, $Q_{84}$="0" is left as it is, thus also leaving $Q_{87}$="1" as it is.

Consequently, under the states as shown in FIGS. 8I, 8M, and 8Q, even when the horizontal scanning position reaches to the position of the 16th sub-row, the addresses LA and CA are not changed over to the 205th and 17th addresses but become continuous.

As described above, in the case of FIGS. 8F to 8Q, the color code and the pattern data of video RAMs 14P and 14C are read out and then displayed respectively.

(j) Under the states as shown in FIGS. 8A to 8E, or the state that the color code and the pattern data of the 1st sub-row are transmitted, if LA="204" is established, $Q_{65}$="0" is satisfied, however, at this time, since $Q_{81}$="1" and SCGT="1" are established, $Q_{84}$="1" is satisfied, so that when the succeeding signal $Q_{76}$ is changed from "0" to "1" and then to "0", the signal $Q_{87}$ is changed from "0" to "1". Thus, by the change of the signal $Q_{87}$, the data "205" of output buffer 64 is loaded to counter 61, and the data "17" of the output buffer 74 is loaded to the counter 71. In other words, the addresses LA and CA respectively become "204" and "16" after "205" and "17".

(k) Thereafter, the state becomes similar to that of operation (M) above, and the address LA is incremented by one address each from the "205" at every line, while the address CA remains as "17".

(1) After the vertical display period is ended, DSP 1="0", DSP 2="0" and SCGT="0" are established (same as operation (N) above). Accordingly, the picture image of one field amount is formed.

As described above, according to the address control circuit 16, as shown in FIG. 9, the read addresses LA and CA of video RAMs 14P and 14C are controlled and the pattern data and the color code are respectively read out.

As set forth above, according to this invention, the sub-row to which the transmitted color code belongs and the line to which the pattern data belongs are made to correspond to the addresses of video RAMs 14C and 14P one by one and only when the pattern data of one sub-row are not complete, the color code and the pattern data belonging to the sub-row are written in the buffer areas (205th to 216th and 17th addresses) and then read out therefrom, while when the pattern data belonging to the sub-row are all complete, the color code and the pattern are read out from the addresses corresponded to the sub-row and the line.

As a result, even if the color code of a certain sub-row is not obtained due to noise, for example, such color code is not merely written in the corresponding address but the succeeding color code can correctly be written in the corresponding address on the basis of the display position code (FIG. 2) indicative of the position of the color code. Therefore, although the color of the sub-row of which the color code can not be obtained due to the noise is disturbed, it is possible to prevent mis-matching from being produced between the displayed pattern and color in the succeeding sub-row. Even if the pattern data of a certain line can not be cbtained, the succeeding pattern data can be correctly written in the corresponding address so that no mis-matching will occur between the displayed pattern and color.

Since the buffer areas (205th to 215th and 17th addresses) of video RAMs 14P and 14C can be changed to desired addresses only by changing the data "205" and "17" of output buffers 64 and 74, it is possible to simplify output buffers 64 and 74 in construction.

Further, the apparatus of this invention can be applied to a television receiver of a television character multiplexing broadcast.

Furthermore, the pattern data written in the buffer areas 205th to 216th addresses of video RAM 14P may not always be transferred to the inherent address at every one address but can be transferred to the inherent address with all its addresses together.

The above description is given on a single preferred embodiment of the invention, but it will be apparent that many modifications and variations could be effected by one skilled in the art without deparing from the spirit or scope of the novel concepts of the invention, so that the scope of the invention should be determined solely by the appended claims.

What is claimed is:

1. Apparatus for scrolling display images derived from a data signal formed as a plurality of packets that include pattern signals formed of a plurality of horizontal lines and a corresponding color signal, said apparatus comprising:

display means for producing a visual display of an input signal as a plurality of horizontal lines;

first memory means connected for receiving and storing said pattern signals and having a plurality of first addresses corresponding respectively to said plurality of horiozontal display lines and having a first buffer area for temporarily storing received pattern signals;

second memory means connected for storing said color signal and having a plurality of second addresses corresponding respectively to said plurality of packets and having a second buffer area for temporarily storing received color signals;

means for storing said pattern signals and a corresponding color signal in said first and second buffer areas, respectively;

means for reading out said first memory means and said first buffer area by accessing aid first addresses in a firt predetermined order and for reading out said second memory means including said second buffer area by accessing said second addresses in a second predetermined order;

means for incrementing the number of an initial accessing address of said first memory means every hroizontal period and means for incrementing the number of an initial accessing address of said second memory means every plurality of horizontal periods, whereby said first and second buffer memory areas are read out respectively, after said first and second memory means; and means for transferring a pattern signal of a horizontal line stored in said first buffer area to a corresponding address of said first memory means and for transferring a corresponding color signal stored in said second buffer area to a corresponding address of said second memory means, whereby said pattern signals and said corresponding color signal are fed to said display means.

2. Apparatus according to claim 1, in which said first and second memory means further include header portions respectively corresponding to upper horizontal display lines of said display means and means for reading out said header portions prior to said initial accessing address.

3. Apparatus according to claim 2, further comprising counter means for producing address accessing signals that determine said accessing addresses of said first and second memory means according to a predetermined pattern.

4. Apparatus according to claim 3, further comprising preset means for presetting said counter means according to said predetermined pattern.

5. Apparatus for displaying scrolling images obtained from a data signal formed as a plurality of packets having pattern signals formed of a plurality of horizontal lines and a corresponding color signal, said apparatus comprising:

display means for producing a visual display as a plurality of horizontal lines;

first memory means connected for storing said pattern signals and having first addresses corresponding to said plurality of horizontal display lines and having a first buffer area for temporarily storing pattern signals received by said first memory means;

second memory means connected for storing said color signal and having second addresses corresponding to said plurality of packets and having a second buffer area for temporarily storing color signals received by said second memory means;

means connected to said first and second memory means for causing said pattern signals and a corresponding color signal to be stored in said first and second buffer areas, respectively;

means for reading out said first memory means and said first buffer area by accessing asid first addresses in a predetermined order;

means for reading out said second memory means including said second buffer area by accessing said second addresses in said predetermined order;

means for incrementing the number of an initial accessing address of said first memory means every horizontal period and means for incrementing the number of initial accessing address of asid second memory means every plurality of horizontal periods, whereby said first and second buffer memory areas are read out respectively, after said first and second memory means; and means for transferring a pattern signal of a horizontal line stored in said first buffer area to a corresponding address of said first memory means and for transferring a corresponding color signal stored in said second buffer area to a corresponding address of said second memory means, whereby said pattern signals and said corresponding color signal are fed to said display means for visual display.

6. Apparatus according to claim 5, in which said first and second memory means further include header portions respectively corresponding to upper horizontal display lines of said display means and means for reading out said header portions prior to said initial accessing address.

7. Apparatus according to claim 6, further comprising counter means for producing address accessing signals that determine said accessing addresses of said first and second memory means according to a predetermined pattern.

8. Apparatus according to claim 7, further comprising preset means for presetting said counter means according to said predetermined pattern.

* * * * *